UNITED STATES PATENT OFFICE.

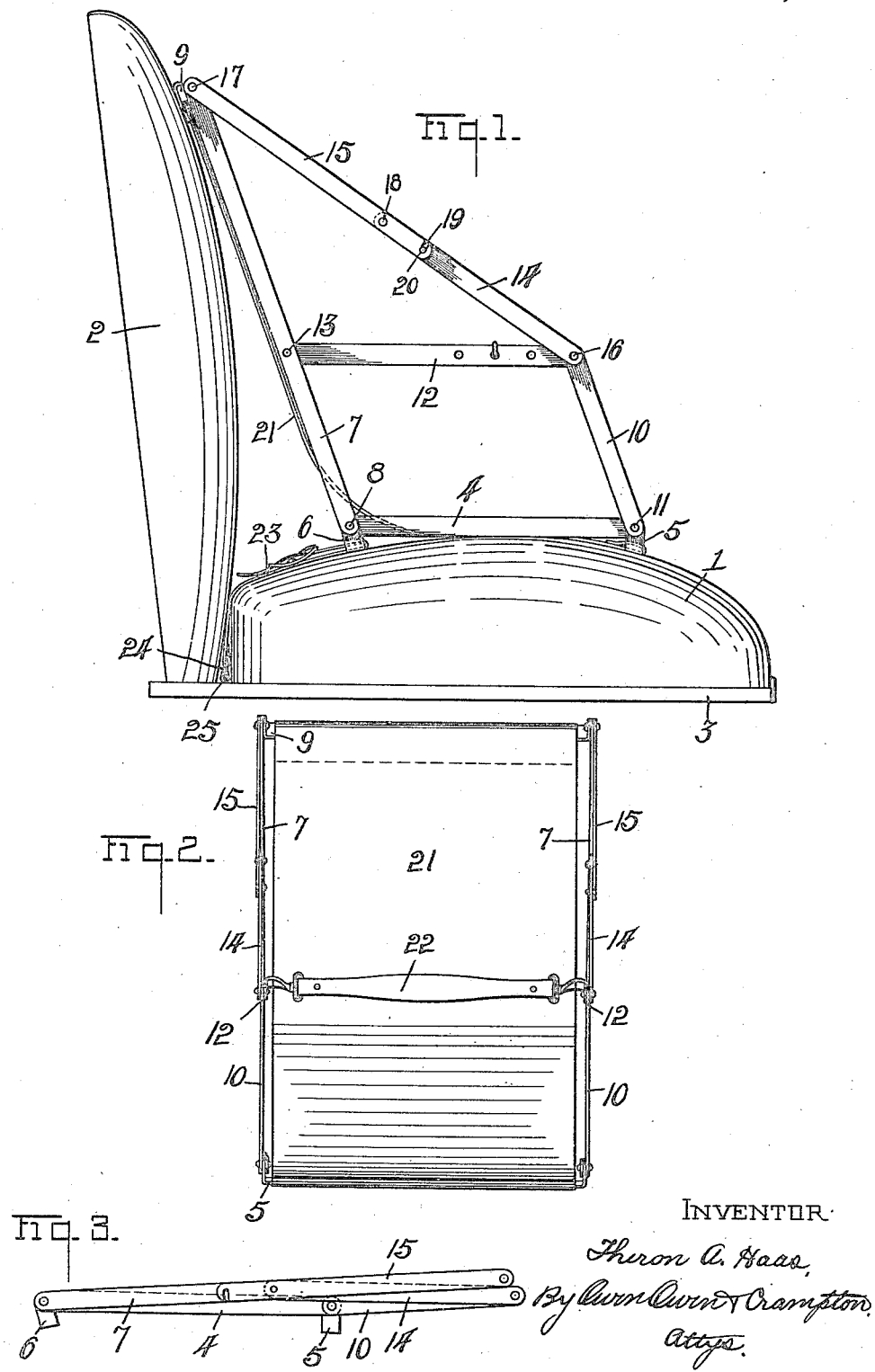

THERON A. HAAS, OF TOLEDO, OHIO.

FOLDABLE CHILD'S SEAT FOR AUTOMOBILES.

1,397,281.                        Specification of Letters Patent.      Patented Nov. 15, 1921.

Application filed July 25, 1921. Serial No. 487,217.

*To all whom it may concern:*

Be it known that I, THERON A. HAAS, a citizen of the United States, and a resident of Toledo, county of Lucas, and State of Ohio, have made an Invention Appertaining to Foldable Children's Seats for Automobiles; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to collapsible seats and particularly to one adapted for use as a child's seat on the seat of an automobile.

Where a person, for instance, the mother of a child, is driving an automobile and has a small child seated at her side, a considerable part of her attention is necessarily directed to the child to keep it from falling off the seat. It is the primary object of this invention to provide a simple, efficient and inexpensive child's seat of the foldable type adapted for use on the seat of an automobile and capable of being fixed thereto, whereby a baby or small child may be carried at the side of the driver without danger of falling out.

The invention is fully described in the following specification, and while in its broader aspect it is capable of embodiment in numerous forms, a preferred embodiment thereof is illustrated in the accompanying drawings, in which,—

Figure 1 is a side elevation of an automobile seat with a seat embodying the invention mounted thereon. Fig. 2 is a front elevation of the child's seat, and Fig. 3 is a side view thereof in folded form.

Referring to the drawings, 1 designates the seat cushion and 2 the back cushion of an automobile seat, and 3 the seat frame on which the seat cushion is mounted.

A child's seat embodying the invention comprises two transversely spaced forwardly and rearwardly extending base-bars 4 rigidly connected at their front ends by a U-shaped cross-bar 5 and at their rear ends by a U-shaped cross-bar 6 which form feet or standard members for resting on the seat cushion 1. A rear upright bar 7 pivotally rises from the rear end of each base-bar 4, being pivoted thereto at 8 and these upright bars are rigidly connected at their upper ends by a U-shaped cross-bar 9 having short leg portions and adapted to have its cross or looped portion rest against the back cushion 2 of the seat. A short front upright bar 10 pivotally rises from the front end of each base-bar 4, being pivoted thereto at 11, and is pivotally connected at its upper end to an arm-rest bar 12, which is pivoted at its rear end to the respective rear upright bar 7, at 13, and coöperates with the bars 4, 7 and 10 to form a parallelogram.

A pair of pivotally connected brace bars 14 and 15 connect the upper end of each front upright bar 10 to the upper end of the respective rear upright bar 7, being pivoted to the former at 16, which constitutes the pivotal connection between the bars 10 and 12, and being pivoted to the bar 7 at 17. The pivotal connection between the brace bars of a pair is designated 18 and the inner end of one bar of a pair laps the other for a distance and is provided in its upper edge with a notch 19 for receiving a stop-pin 20 on the other bar when the brace bars are in set up or straightened out position, thereby preventing a breaking in one direction only of the joint between the brace bars.

The seat and back member of the child's seat comprises a strip of canvas or other similar material 21 looped about or otherwise suitably connected at its upper and lower ends to the cross-bars 9 and 5, respectively. A strap 22 for retaining a child in the seat, adjustably connects the two arm rear members 12.

The child's seat is anchored to the automobile seat by one or more straps 23 adjustably connected to the cross portion of the rear cross-bar 6 and provided with snap hooks 24 at their outer ends for engaging eyes 25 secured to the seat frame 3 at the rear of the cushion 1.

It is evident that I have provided a simple and inexpensive type of child's seat which is strong and durable in its construction and capable of being easily and quickly mounted on and securely anchored to an automobile seat. It is also evident that the child's seat can be folded in compact form when not in use and that the longest dimension thereof when folded is the length of the rear bars 7, as the bars 4 and 10 swing upward against the rear bar 7 with a combined length substantially that of the rear bars and the brace bars 14 and 15 break and fold inward and rearward.

I wish it understood that my invention is not limited to any specific construction, arrangement or form of the parts, as it is capable of embodiment in numerous forms, without departing from the spirit of the claims.

Having thus described my invention, what I claim as new and desire to secure by Letters Patent, is,—

1. A seat of the class described, comprising spaced forwardly and rearwardly extending base-bars, cross members connecting the front and rear ends of the cross-bars, a rear upright bar pivotally rising from the rear end of each base bar, a front short upright bar pivotally rising from the front end of each base bar, an arm rest bar parallel to the base bars and connecting the upper end of each front upright bar to the respective rear upright bar intermediate its ends and being pivoted to each, a pair of hingedly connected brace bars pivoted at their outer ends to the upper ends of the front and rear upright bars, a cross-bar connecting the upper ends of the rear upright bars, a canvas member connecting the upper and lower front cross member to form a seat and back portion, and means for anchoring the child's seat to an automobile seat.

2. The combination with an automobile seat, of a foldable child's seat, capable of being mounted on the automobile seat and having a pair of transversely spaced forwardly and rearwardly extending base-bars, U-shaped cross foot members connecting the base-bars at their front and rear ends, front and rear upright bars pivotally rising from each base-bar, the front bars being short, arm rest bars connecting the front and rear bars in parallel relation to the base-bars and pivoted to the former, a pair of pivotally connected bars connecting the upper ends of the front and rear bars and pivoted to each, a cross-bar connecting the upper ends of the rear upright bars, a canvas member connecting the upper cross-bar and the lower front cross-bar and forming the seat and back of the child's seat, and means for releasably anchoring the rear lower cross-bar to the automobile seat frame.

In testimony whereof I have hereunto subscribed my name to this specification.

THERON A. HAAS.